Patented May 29, 1934

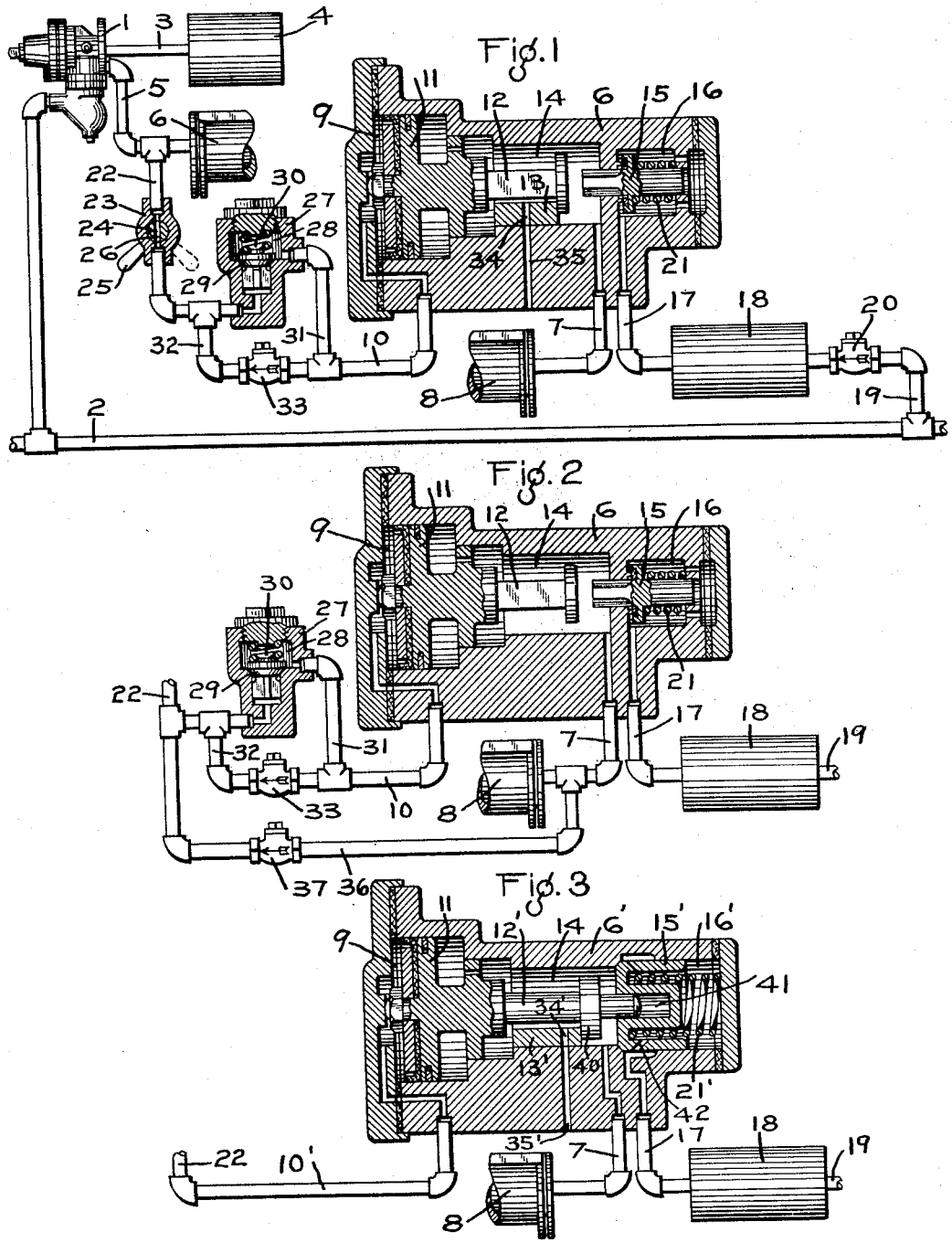

1,960,338

UNITED STATES PATENT OFFICE 1,960,338

EMPTY AND LOAD BRAKE

Ellis E. Hewitt, Edgewood, Frank B. Thomas, Forest Hills, and Ellery R. Fitch, Edgewood, Pa., assignors to The Westinghouse Air Brake Company, Wilmerding, Pa., a corporation of Pennsylvania Application October 31, 1931, Serial No. 572,247

1 Claim. (Cl. 303—23)

This invention relates to fluid pressure brakes, and more particularly to a brake apparatus of the empty and load type, in which a greater braking force is obtained on loaded cars than on empty cars.

The principal object of our invention is to provide an improved and simplified brake apparatus of the above type.

Other objects and advantages will appear in the following more detailed description of the invention.

In the accompanying drawing; Fig. 1 is a diagrammatic view, partly in section, of a brake equipment embodying one form of our invention; Fig. 2 a similar view, embodying a modified form of our invention; and Fig. 3 a similar view, embodying another modified form of our invention.

According to the construction shown in Fig. 1, the equipment may comprise a triple valve device 1 of the usual type, connected to the usual brake pipe 2 and by a pipe 3 to the usual auxiliary reservoir 4. The triple valve device is adapted to be operated in the usual manner, upon a reduction in brake pipe pressure, to supply fluid under pressure from the auxiliary reservoir 4, through a brake cylinder supply pipe 5 to a brake cylinder 6, which, in the present instance is the empty brake cylinder of a load brake equipment.

According to our invention, a control valve device 6 is provided for controlling the admission and release of fluid under pressure, through a pipe and passage 7 to a load brake cylinder 8.

The valve device 6 may comprise a casing having a piston chamber 9 connected to a pipe 10 and containing a piston 11. The piston stem 12 of piston 11 is adapted to operate a release slide valve 13 contained in valve chamber 14 and also a poppet supply valve 15, contained in valve chamber 16. The valve chamber 16 is connected by pipe 17 to a load reservoir 18, which reservoir is adapted to be charged with fluid under pressure as supplied from the brake pipe 2, through pipe 19 containing a non-return check valve 20. A coil spring 21 urges the valve 15 to its seat.

A pipe 22 is connected to pipe 5 and leads to a check valve device 27. In pipe 22 is interposed a cut-out cock device 23 having a plug valve 24 adapted to be operated by a handle 25. With the valve 24 in the position shown, a passage 26 on the valve establishes communication through pipe 22. In the dotted line position of the handle, communication through the pipe 22 is cut off.

The check valve device 27 comprises a casing having a chamber 28 containing a check valve 29, weighted to its seat by a spring 30, and adapted to permit flow from pipe 22 to a pipe 31, connected to the pipe 10. A by-pass pipe 32 connects pipe 10 with pipe 22 and in said pipe is a non-return check valve 33.

In operation, the plug valve 24 being set for load braking, the position shown in the drawing, when the brake pipe pressure is reduced, the triple valve device 1 operates in the usual manner to supply fluid under pressure from the auxiliary reservoir 4 to the empty brake cylinder 6. Fluid at the pressure supplied to the empty brake cylinder is also supplied to pipe 22 and flows in the load position of the valve 24 to the check valve 29.

The spring 30 is preferably such that when the pressure of fluid supplied to the empty brake cylinder is sufficient to cause the empty brake cylinder to move out and take up the slack in the brake rigging and apply the brake shoes to the car wheels, the brake cylinder pressure will be sufficient to overcome the pressure of spring 30, so that the check valve 29 is unseated, permitting flow of fluid under pressure from pipe 22 to pipe 31 and thence through pipe 10 to the piston chamber 9.

The pressure of fluid supplied to the piston chamber 9, causes the piston 11 to be shifted to the right, operating the valve 13 to cut off communication from valve chamber 14, through port 34 to atmospheric exhaust port 35 and then operating to unseat the valve 15. Fluid under pressure is then supplied from the load reservoir 18 to valve chamber 14 and thence through passage 7 to the load brake cylinder 8.

When the pressure in valve chamber 14 and in the load brake cylinder 8 has been increased to a degree slightly exceeding the empty brake cylinder pressure acting in piston chamber 9, the piston 11 will be shifted to the left sufficiently to permit the valve 15 to seat and cut off the further supply of fluid under pressure to the load brake cylinder.

When the brake pipe pressure is increased to effect the release of the brakes, the triple valve device 1 is operated in the usual manner to effect the release of fluid from the empty brake cylinder 6. Fluid is also released from the piston chamber 9 by way of the by-pass pipe 32 and past the check valve 33. Upon releasing fluid from the piston chamber 9, the piston 11 is shifted to the left by the brake cylinder pressure in valve chamber 14, to the release position, shown in Fig. 1, in which fluid is exhausted from the valve chamber 14 and the load brake cylinder 8 by way of port 34 and exhaust passage 35.

In the construction shown in Fig. 2, the same control valve 6 is employed, except that the release valve 13 is omitted, and the check valve device 27 is also the same as that shown in Fig. 1. The only difference in operation, is that in releasing the brakes, fluid is directly released from the load brake cylinder 8 by way of a pipe 36, which connects pipe 7 with pipe 22 and which contains a non-return check valve 37. It will be evident that when fluid is released from the empty brake cylinder 6, fluid is also released from the load brake cylinder 8 by way of pipe 36 and pipe 22, which is connected to pipe 5 as in the Fig. 1 construction.

According to the construction shown in Fig. 3, the control valve itself is arranged to accomplish the purpose of the spring loaded check valve 29 employed in Figs. 1 and 2. For this purpose, the control valve 6' is provided with a piston 11 having a stem 12' which is provided with a collar 40 adapted to engage the supply valve 15' upon a certain initial movement of the piston 11, the outer end of the stem 12' being guided in a bore 41 of the valve 15'.

The valve 15' is in the form of a piston subject on one side to the pressure in valve chamber 14 and on the opposite side to the pressure of fluid supplied from the load reservoir 18 to the valve chamber 16' and to the pressure of spring 21'. Fluid under pressure is supplied from pipe 17 to the valve chamber 16' by way of a port 42 in the valve 15'.

In operation of the construction shown in Fig. 3, when fluid under pressure is supplied to the empty brake cylinder 6, fluid under pressure is also supplied through pipe 22 and pipe 10' to piston chamber 9. The piston 11 is then shifted to the right, first taking up the lost motion between the release slide valve 13' and the piston stem 12' and then moving the release valve 13' so as to cause the port 34' to be moved out of registry with the exhaust passage 35'.

The collar 40 is then brought into engagement with the valve piston 15' and the further movement of the piston 11 to the right is arrested until the pressure of fluid supplied to the empty brake cylinder and to the piston chamber 9 has been increased to a degree slightly exceeding the pressure of spring 21' plus the pressure of fluid supplied from reservoir 18 to chamber 16' and acting on the area of valve piston 15', which area is substantially less than the area of piston 11.

The piston 11 is then moved further to the right, so as to unseat the valve piston 15', and permit the flow of fluid under pressure from the reservoir 18 to the valve chamber 14 and thence by way of pipe 7 to the load brake cylinder 8.

When the fluid pressure in valve chamber 14, acting on the differential area of piston 11 with respect to the area of the valve piston 15' plus the pressure of spring 21' and the pressure acting on the valve piston 15' in valve chamber 16' slightly exceeds the empty brake cylinder pressure as supplied to piston chamber 9, the piston 11 will be shifted to the left, permitting the valve piston 15' to seat, and cut off the further supply of fluid under pressure to the valve chamber 14 and to the load brake cylinder 8. It will thus be seen that fluid under pressure is not supplied to the load brake cylinder, until the pressure in the empty brake cylinder has been increased to a predetermined degree.

If the pressure in the empty brake cylinder is further increased, the piston 11 will be again operated to cause the valve piston 15' to be unseated, so as to supply additional fluid under pressure to the load brake cylinder 8, and as previously described, the valve piston 15' will again seat, when the pressure in valve chamber 14 has been increased to a predetermined degree, less than the pressure of fluid supplied to the piston chamber 9.

In releasing the brakes, fluid under pressure is first released from the empty brake cylinder 6 by the usual operation of the triple valve device 1, and fluid under pressure is also released from the piston chamber 9. The pressure of fluid in valve chamber 14 and in the load brake cylinder 8 is, however, a predetermined degree less than the pressure of fluid in the piston chamber 9, so that the pressure of fluid in the empty brake cylinder and in the piston chamber 9 must be reduced to a degree slightly less than the lower load brake cylinder pressure, before the piston 11 will be moved to the left. When the pressure in piston chamber 9 has been so reduced, the piston 11 is shifted to the release position, as shown in Fig. 3, so that the load brake cylinder and valve chamber 14 are vented to the atmosphere by way of port 34' and the atmospheric exhaust passage 35'.

It will thus be seen that in releasing the brakes, fluid under pressure is not released from the load brake cylinder 8, until the pressure in the empty brake cylinder has been reduced to a degree slightly less than the pressure of fluid contained in the load brake cylinder.

For empty car braking, the handle 25 is turned to its dotted line position, as shown in Fig. 1, in which communication through the pipe 22 is cut off. When the brakes are applied by operation of the triple valve device 1, with the cock 23 in its closed position, fluid under pressure will only be supplied to the empty brake cylinder 6.

From the foregoing, it will be seen that we have provided a very simple apparatus by which the brakes are applied on loaded cars with greater force than on empty cars.

While one illustrative embodiment of the invention has been described in detail, it is not our intention to limit its scope to that embodiment or otherwise than by the terms of the appended claim.

Having now described our invention, what we claim as new and desire to secure by Letters Patent, is:

In an empty and load brake equipment, the combination with an empty car brake cylinder and a load brake cylinder, of a reservoir charged with fluid under pressure, a valve device comprising a valve piston subject on one side to the pressure in said reservoir for controlling the supply of fluid under pressure from said reservoir to the load brake cylinder, a spring for opposing the opening of said valve piston, and a piston operated by a substantial predetermined increase in the pressure of fluid supplied to the empty brake cylinder for operating said valve piston to supply fluid from the reservoir to the load brake cylinder.

ELLIS E. HEWITT.
FRANK B. THOMAS.
ELLERY R. FITCH.